US011907693B2

(12) United States Patent
Bai et al.

(10) Patent No.: US 11,907,693 B2
(45) Date of Patent: Feb. 20, 2024

(54) JOB DECOMPOSITION PROCESSING METHOD FOR DISTRIBUTED COMPUTING

(71) Applicant: ZHEJIANG LAB, Zhejiang (CN)

(72) Inventors: Wenyuan Bai, Hangzhou (CN); Feng Gao, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/110,910

(22) Filed: Feb. 17, 2023

(65) Prior Publication Data

US 2023/0350652 A1    Nov. 2, 2023

Related U.S. Application Data

(63) Continuation of application No. PCT/CN2022/092960, filed on May 16, 2022.

(30) Foreign Application Priority Data

Apr. 29, 2022    (CN) .......................... 202210466088.0

(51) Int. Cl.
*G06F 8/71* (2018.01)
*G06F 8/41* (2018.01)

(52) U.S. Cl.
CPC ................ *G06F 8/443* (2013.01); *G06F 8/71* (2013.01)

(58) Field of Classification Search
CPC .................................. G06F 8/443; G06F 8/71
(Continued)

(56) References Cited

U.S. PATENT DOCUMENTS

| 7,861,240 B2 | 12/2010 | Teranishi |
| 9,043,771 B1 | 5/2015 | Vardhan et al. |

(Continued)

FOREIGN PATENT DOCUMENTS

| CN | 102096603 A | 6/2011 |
| CN | 110321223 A | 10/2019 |

(Continued)

OTHER PUBLICATIONS

Guo et al, Automatic Task Re-Organization in MapReduce, IEEE, 2011, p. 335-343. (Year: 2011).*

(Continued)

*Primary Examiner* — John Q Chavis
(74) *Attorney, Agent, or Firm* — W&G Law Group

(57) ABSTRACT

A job decomposition processing method for distributed computing, which comprises: analyzing a source program to be run by program static analysis to determine a function call graph contained in the source program; determining feature information of functions contained in the source program by program dynamics analysis or/and a program intelligent decomposition algorithm, wherein the feature information of the functions is used to characterize relevant information when each function is being running; decomposing the source program based on the feature information of the functions, a function relationship and available resource information of a computing platform to form an execution recommendation for each function on the computing platform, i.e., which hardware resources are used for computing each function; finally inserting a modifier in the source program and starting computation on the computing platform.

11 Claims, 7 Drawing Sheets

(58) Field of Classification Search
USPC .......................................................... 717/157
See application file for complete search history.

(56) References Cited

U.S. PATENT DOCUMENTS

2015/0378696 A1* 12/2015 Boehm .................. G06F 8/445
717/149
2019/0108067 A1 4/2019 Ishikawa et al.

FOREIGN PATENT DOCUMENTS

| | | |
|---|---|---|
| CN | 110806931 A | 2/2020 |
| CN | 111475516 A | 7/2020 |
| CN | 112149808 A | 12/2020 |
| CN | 113342489 A | 9/2021 |
| CN | 113434548 A | 9/2021 |
| CN | 113535363 A | 10/2021 |
| CN | 114327880 A | 4/2022 |
| WO | 2018045541 A1 | 3/2018 |
| WO | 2018236691 A1 | 12/2018 |

OTHER PUBLICATIONS

International Search Report (PCT/CN2022/092960); dated Dec. 19, 2022.
CN First Office Action(202210466088.0); dated Jun. 20, 2022.
CN Notice of Allowance(CN202210466088.0); dated Jul. 11, 2022.
Communication-Efficient-Task-Scheduling-for-Real-Time-Distributed-Computing.
Static-Data-Allocation-Based-on-Function-Call-Graph.

* cited by examiner

Analyzing a source program to be run by program static analysis to determine a function call graph contained in the source program that is being run, wherein the function call graph is used to characterize a call relationship between functions contained in the source program

↓

Determining function feature information in the functions contained in the source program according to the call relationship between the functions, wherein the function feature information is used to characterize function computing-related information when each function is being run

↓

Decomposing the source program according to the function feature information, a function relationship and available resource information of a platform where a source program is to be run, and determining a running relationship between the functions contained in the source program and an execution recommendation for each function on the platform when the source program is being run on the platform, wherein the running relationship includes serial running and/or parallel running, and the execution recommendation is used to indicate hardware resources on the platform to execute each function

↓

Inserting a modifier of codes based on a distributed computing framework in the source program according to the function call relationship and the execution recommendation, so that the source program is able to conduct distributed computing on the platform

↓

Running the source program in which the modifier has been inserted on the platform according to the execution recommendation

FIG. 1

JOB DECOMPOSITION PROCESSING METHOD FOR DISTRIBUTED COMPUTING

CROSS-REFERENCE TO RELATED APPLICATIONS

The present application is a continuation of International Application No. PCT/CN2022/092960, filed on May 16, 2022, which claims priority to Chinese Application No. 202210466088.0, filed on Apr. 29, 2022, the contents of both of which are incorporated herein by reference in their entireties.

TECHNICAL FIELD

The present disclosure relates to a job decomposition method in the field of intelligent computing, and in particular to a job decomposition processing method for distributed computing.

BACKGROUND OF THE INVENTION

With the development of computing technology, large-scale of computing ability is required for some applications. With centralized computing, considerable amounts of time is consumed to deal with the applications, whereas with distributed computing, as a method opposite to centralized computing, decompose an application to multiple components and distribute them to multiple computing resources, which gives the benefits of overall time reduction and enormous efficiency improvement.

Hadoop is a distributed system infrastructure developed by Apache Foundation. Users can develop distributed programs without knowing the underlying details of distributed components. It mainly composed of HDFS which is a distributed file system and MapReduce algorithm. The MapReduce algorithm provides a parallel programming model and method. Inspired by the primitives present in Lisp which is a functional programming language, it provides a parallel programming architecture. Two functions, Map and Reduce, are used to deal with basic parallel computing tasks, providing abstract operation and parallel programming interfaces. Map and Reduce functions are needed to program separately, so that the framework could manage the execution and communication between various parallel tasks, providing for fault tolerance of any tasks and hardware redundancy.

Similar to the open-source Hadoop MapReduce framework created by the UC Berkeley AMP Lab, Spark is a quick and all-purpose computing engine that was specifically created for processing enormous amounts of data. Spark offers the benefit over MapReduce in that output results can be stored in memory, eliminating the requirement to read and write HDFS once again. Spark can therefore provide interactive searches and improve the workload of iteration, making it more appropriate for MapReduce algorithms that require iteration, such as data mining and machine learning. Spark is implemented in Scala language, which uses Scala as its application framework. Scala can operate distributed data sets as simply as local collection objects thanks to Spark and Scala's close integration, which is not the case with Hadoop. It can be understood that Spark serves as an addition to Hadoop MapReduce that enables iterative tasks on distributed data sets.

Ray is a distributed framework for machine learning proposed by UC Berkeley RISELab in 2017. Similar to TensorFlow, Ray is also a scenario framework for machine learning, but used as a distributed computing framework for the reason that the core part of Ray provides the ability of distributed computing. Compared with Spark, Ray includes a relatively compact distributed computing manner, and thereby appears to the native Python function. As long as @ray.remote is annotated, and the function can be executed in nodes of other Ray clusters beside the native node. Therefore, Ray is capable of distributed computing without making user codes more complexity. In addition to the advantages of lightweight API, Ray also has advantages such as scheduling ability with high throughput and low latency and supporting the dynamic construction of tasks.

MapReduce, Spark and Ray are widely used as distributed computing frameworks. However, a common premise thereof is that it is necessary to take the distributed computing framework into consideration at the beginning of designing program and write the program with corresponding programming API languages. It is extremely difficult to modify a completed program into a distributed program, since the jobs with distributed execution requirements generally have an enormous program body with a large number of logical details and complicated design ideas. However, in the Internet industry, the programs that needs to be rewritten into a distributed computing mode are usually rewritten and understood by other programmers due to high mobility of workers in the Internet industry.

SUMMARY OF THE INVENTION

In order to address the shortcomings of the prior art, the present disclosure provides a job decomposition processing method for distributed computing.

The purpose of the present disclosure is achieved by the following technical solution: a job decomposition processing method for distributed computing, including the following steps:

A source program to be run by program static analysis is analyzed to determine a function call graph contained in the source program that is being run. In an embodiment, the function call graph is configured to characterize a Call relationship between functions contained in the source program.

Function feature information in the functions contained in the source program is determined according to the Call relationship between the functions. In an embodiment, the function feature information is configured to characterize function computing-related information when each function is being run.

The source program is decomposed according to the function feature information, a function relationship and available resource information of a platform where a source program is to be run, and a running relationship between the functions contained in the source program and an execution recommendation for each function on the platform is determined when the source program is being run on the platform. In an embodiment, the running relationship includes serial running and/or parallel running, and the execution recommendation is configured to indicate hardware resources on the platform to execute each function.

A modifier of codes based on a distributed computing framework is inserted in the source program according to the function Call relationship and the execution recommendation, so that the source program is capable of distributed computing on the platform.

The source program in which the modifier has been inserted is run on the platform according to the execution recommendation.

The beneficial effects of the present disclosure are as follows. The job decomposition method according to the present disclosure is performed by processing a non-distributed source program, understanding and analyzing the source program, and integrating available resource information of the computing platform, identifying the portions of the source program that can be distributed-executed, and inserting a distributed execution framework similar to MapReduce, Spark, or Ray in a manner that is less intrusive to the input of the source program. With the help of the job decomposition method described herein, the source program can be distributed-executed without making any modification to the source program by the user himself, so as to ensure repeatability of the distributed modification scheme to the source program, avoid the subjectivity of human operation, and save the cost of the human operation at the same time, thereby having the advantages such as flexibility, ubiquity, and convenience.

BRIEF DESCRIPTION OF DRAWINGS

FIG. 1 is a flow chart of the method of the present disclosure;

DETAILED DESCRIPTION OF THE INVENTION

Figure 2:
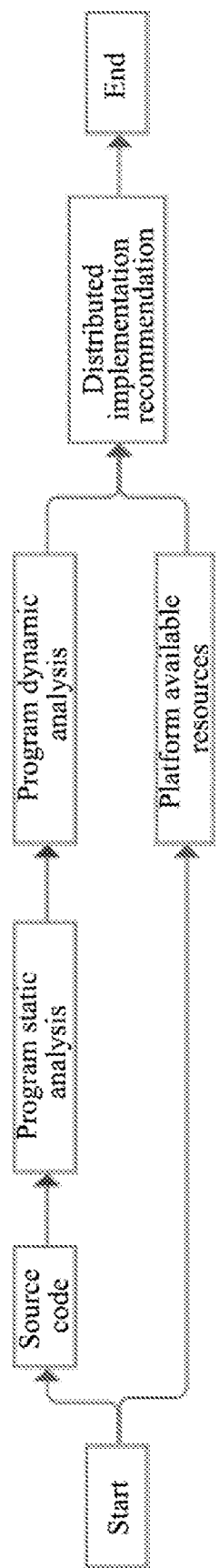
FIG. 2 is a schematic flow diagram of Example 1 of the present disclosure.

As shown in FIG. 1, the present disclosure provides a job decomposition processing method for distributed computing, including the following steps.

(1) A source program to be run by program static analysis is analyzed to determine a function call graph contained in the source program that is being run. In an embodiment, the function call graph is used to characterize a call relationship between functions contained in the source program.

In an embodiment, the step of analyzing a source program to be run by program static analysis to determine a function call graph contained in the source program that is being run includes the following steps.

The codes of the source program without running the codes of the source program is scanned to determine the function call graph contained in the source program. Exemplarily, the function call graph is a directed acyclic graph.

The method further includes: saving the function call graph with an adjacency table.

Further, the step of scanning the codes of the source program without running the codes of the source program to determine the function call graph contained in the source program includes the following steps.

The codes of the source program are segmented and collected. The program are segmented into a plurality of packages, dependencies within the plurality of packages are analyzed and managed, and a node call relationship graph is created.

Function information of each function is extracted in the source program. According to declaring and calling mode of the functions, different information extraction structures are constructed to extract information about parameters and types of the parameters, respectively, so as to obtain an inter-function relationship table.

A function call graph is generated based on the node call relationship graph and the inter-function relationship table.

(2) Function feature information in the functions contained in the source program is determined according to the call relationship between the functions. In an embodiment, the function feature information is used to characterize function computing-related information when each function is being run.

In an embodiment, the step of determining function feature information in the functions contained in the source program according to the call relationship includes: determining the function feature information in the functions contained in the source program by program dynamics analysis according to the call relationship.

In an embodiment, the step of determining the function feature information in the functions contained in the source program by program dynamics analysis according to the call relationship includes:

instrumentation is performed on each function in the program before the source program is run;

When the source program is being run, instrumented recording functions is entered to record feature data at the time of execution of each function. In an embodiment, the feature data comprises at least one of the following function computing-related information: GPU, CPU, memory, I/O, run time.

In an embodiment, the step of determining function feature information in the functions contained in the source program according to the call relationship includes: determining the function feature information in the functions contained in the source program according to the call relationship by a pre-trained program intelligent decomposition algorithm.

In an embodiment, an input of the program intelligent decomposition algorithm is the call relationship and an output is the function feature information in the functions contained in the source program.

Further, the training process of the program intelligent decomposition algorithm includes:

In case of a consistent data amount, each function in different programs is repeatedly executed for at least twice on a single resource to obtain a function feature information average value corresponding to each function.

the function feature information average values of the different functions are grouped, and a program intelligent decomposition algorithm model is obtained based on a grouping result by using machine learning and/or a knowledge graph model to train;

In an embodiment, training data is average values obtained by repeated execution of functions on the single resource, and generated function feature tables. A training result is to group the function feature tables and form the program intelligent decomposition algorithm based on machine learning and knowledge graph model.

Exemplarily, the program intelligent decomposition algorithm includes at least one of the following modes: similarity metric modeling, regression similarity learning, classification similarity learning, and ranking similarity learning.

(3) According to the function feature information, a function relationship and available resource information of a platform on which a source program is to be run, the source program is decomposed to determine a running relationship between the functions contained in the source program and an execution recommendation for each function on the platform when the source program is being run on the platform. In an embodiment, the running relationship includes serial running and/or parallel running, and the execution recommendation is used to indicate hardware resources on the platform to execute each function.

Exemplarily, the hardware resources of the platform include at least one of servers, virtual machines, gateways, end computing devices. The execution recommendation is characterized by an execution recommendation table.

(4) A modifier of codes is inserted based on a distributed computing framework in the source program according to the function call relationship and the execution recommendation, so that the source program is able to conduct distributed computing on the platform.

Exemplarily, the codes based on a distributed computing framework include one of MapReduce, Ray, and Spark.

(5) The source program in which the modifier has been inserted is run on the platform according to the execution recommendation.

According to the job decomposition method of the present disclosure is performed by processing a non-distributed source program, understanding and analyzing the source program, and integrating available resource information of the computing platform, identifying the portions of the source program that can be distributed-executed, and inserting a distributed execution framework similar to MapReduce, Spark, or Ray in a manner that is less intrusive to the input of the source program. In contrast to methods in the prior art, in this method the source program can be distributed-executed without any modification of the source program by the user himself, thus ensuring the repeatability of the distributed modification scheme of the source program.

With respect to this method, the present disclosure proposes three Examples, with which the job decomposition process of distributed computation can be completely implemented on the premise of inputting the same piece of source code.

Example 1

As shown in FIG. 2, a distributed execution policy was determined for a source program to be run by program static analysis and program dynamic analysis methods in combination with resource information available to a platform running the source program.

A source program to be run was analyzed by program static analysis to determine a function call graph contained in the source program that was being run. In an embodiment, the function call graph was used to characterize a call relationship between functions contained in the source program.

Function feature information in the functions contained in the source program is determined according to the call relationship between the functions. In an embodiment, the function feature information was used to characterize function computing-related information when each function was being run.

The source program was decomposed according to the function feature information, a function relationship and available resource information of a platform on which a source program was to be run, and a running relationship between the functions contained in the source program and an execution recommendation for each function on the platform when the source program was being run on the platform were determined. In an embodiment, the running relationship includes serial running and/or parallel running, and the execution recommendation is used to indicate hardware resources on the platform to execute each function.

According to the function call relationship and the execution recommendation, a modifier of codes based on a distributed computing framework in the source program was inserted, so that the source program was capable of performing distributed computing on the platform.

The source program in which the modifier have been inserted was run on the platform according to the execution recommendation.

Example 2

Figure 3:
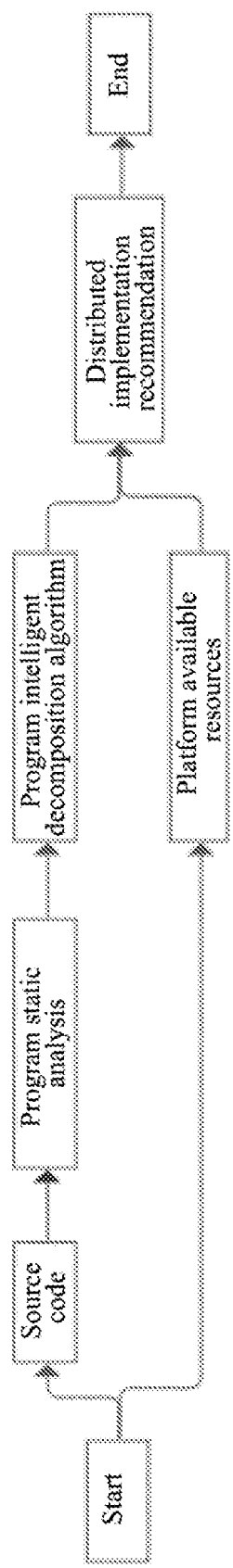
FIG. 3 is a schematic flow diagram of Example 2 of the present disclosure.

As shown in FIG. 3, a distributed execution policy was determined for a source program to be run by a program static analysis and a program intelligent decomposition algorithm in combination with information on available resources of a platform running the source program.

The same point as in Example 1 is that the source program to be run was analyzed by program static analysis to determine the function call graph contained in the source program.

The difference from the Example 1 is that the Example 2 used a program intelligent decomposition algorithm to determine function feature information in functions contained in the source program, and the function feature information was used to characterize function computing-related information when each function is being run.

The program intelligent decomposition algorithm needed to be pre-trained. After the source program is input, the function feature information among the functions contained in the source program was determined according to the pre-trained algorithm model.

The program intelligent decomposition algorithm was pre-trained by repeatedly executing each function in different programs for at least twice on a single resource in case of a consistent data amount to obtain a function feature information average value corresponding to each function.

The function feature information average values of the different functions were grouped, and a program intelligent decomposition algorithm model was obtained based on a grouping result by using machine learning and/or a knowledge graph model to train.

Example 3

Figure 4:
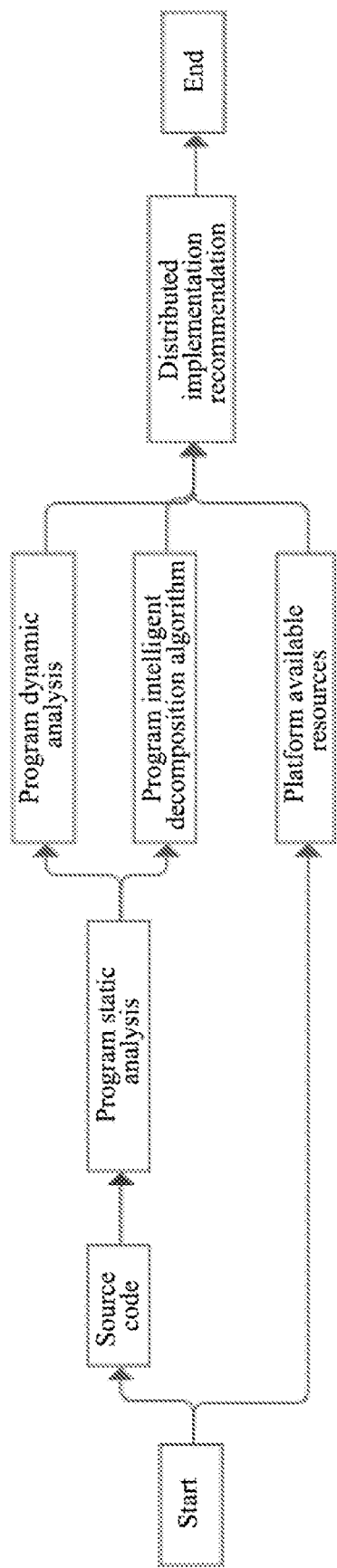
FIG. 4 is a schematic flow diagram of Example 3 of the present disclosure.

As shown in FIG. 4, after performing program static analysis on a source program to be run, a distributed execution policy was determined by program dynamic analysis and program intelligent decomposition algorithm in combination with information on available resources of a platform running the source program.

The same point as in Example 1 is that the source program to be run was analyzed by program static analysis to determine the function call graph contained in the source program.

The difference from the Example 1 is that the Example 3 used a program intelligent decomposition algorithm in combination with the program dynamics analysis method to determine function feature information in functions contained in the source program, and the function feature information was used to characterize function computing-related information when each function is being run.

The outputs of both the program intelligent decomposition algorithm and the program dynamics analysis method were function feature information for functions in the source program, and the two pieces of functional feature information will be retained. In addition, the available resource information of the platform on which the source program was to be run would be judged. If the available resources of the platform was insufficient, the scheme with less resource consumption would be selected after comparing the two pieces of functional feature information. If the available resources of the platform were sufficient, the scheme with more resource consumption would be selected to provide the function execution recommendation.

After aggregating the execution recommendations of various functions, the source program was decomposed to determine the running relationship between the functions contained in the source program and the execution recommendations of the functions on the platform on which the source program was being run on the platform.

Example 4

Figure 5:
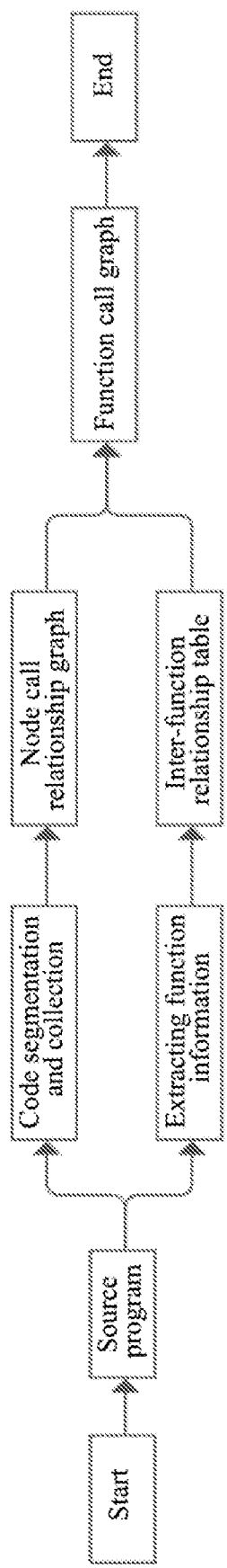
FIG. 5 is a schematic flow diagram of Example 4 of the present disclosure.

As shown in FIG. 5, a program static analysis method was adopted on a source program to be run to generate a function call graph, which was specifically achieved as follows.

The codes of the source program were scanned, the codes of the source program were segmented and collected, the program was divided into a plurality of packages, dependencies within the plurality of packages were analyzed and managed, and a node call relationship graph was created.

Function information of each function in the source program was extracted. Different information extraction structures were constructed according to declaring and calling mode of the functions to extract information about parameters and types of the parameters, respectively. Accordingly, an inter-function relationship table was created.

A function call graph was generated based on the node call relationship graph and the inter-function relationship table.

Example 5

Figure 6:
FIG. 6 is a schematic flow diagram of Example 5 of the present disclosure.

As shown in FIG. 6, a program dynamic analysis method was adopted on the source program to be run, and the function feature information was generated, which was specifically achieved as follows:

First, a source program to be run was processed using an instrumentation technique Instrumentation is an operation technique of inserting a probe in a program, and the call relationship between functions and feature information of each function were obtained by executing the probe on the basis of guaranteeing the original logical integrity of the program.

In particular, in order to solve problems such as impeded code operation after instrumentation due to excessive number of probe points, and to reduce overhead and ensure efficiency of instrumentation, probes for instrumentation can be placed before the first execution statement of each function, and when the program runs to the detection point, the probes enter the instrumentation record function, either recording the intra-function execution path or probing the order of inter-function calls.

After the instrumentation operation was completed, the program began to be run. The log records were collected based on the instrumentation to obtain the execution trace of the function during the running operation, thereby obtaining feature information of the function.

Example 6

Function feature information was inferred by a program intelligent decomposition algorithm on the source program to be run using knowledge graphs and/or deep learning methods. Deep learning techniques have advantages on performing a variety of tasks (e.g., classification, generation, etc.) on a variety of data sets, with high precision and recall, and poor interpretability. Knowledge graph, on the other hand, outperforms deep learning methods on interpretability and reusability, but underperforms on precision. In practice, the two methods may be used alone or in combination.

If deep learning is used to implement a procedural intelligent decomposition algorithm, examples may be implemented in one or more of the following ways.
 (1) Similarity metric modeling: the similarity metric can be modeled as a regression problem, as well as a classification problem or a ranking problem.
 (2) Regressive similarity learning: given a pair of inputs and their similarity measure values, an approximation function is learned on the triplet training dataset.
 (3) Classification similarity learning: a binary label is associated for each pair of training data, the label represents whether two objects of the input are similar with each other.
 (4) Ranking similarity learning: the goal of ranking similarity learning is to learn a similarity measure function such that a new triple holds.

Example 7

When the deep learning or/and knowledge graph method was used, the model training process was repeatedly executed for at least twice on a single resource in case of a consistent data amount, and the function feature information average value corresponding to each function was obtained.

Figure 7:
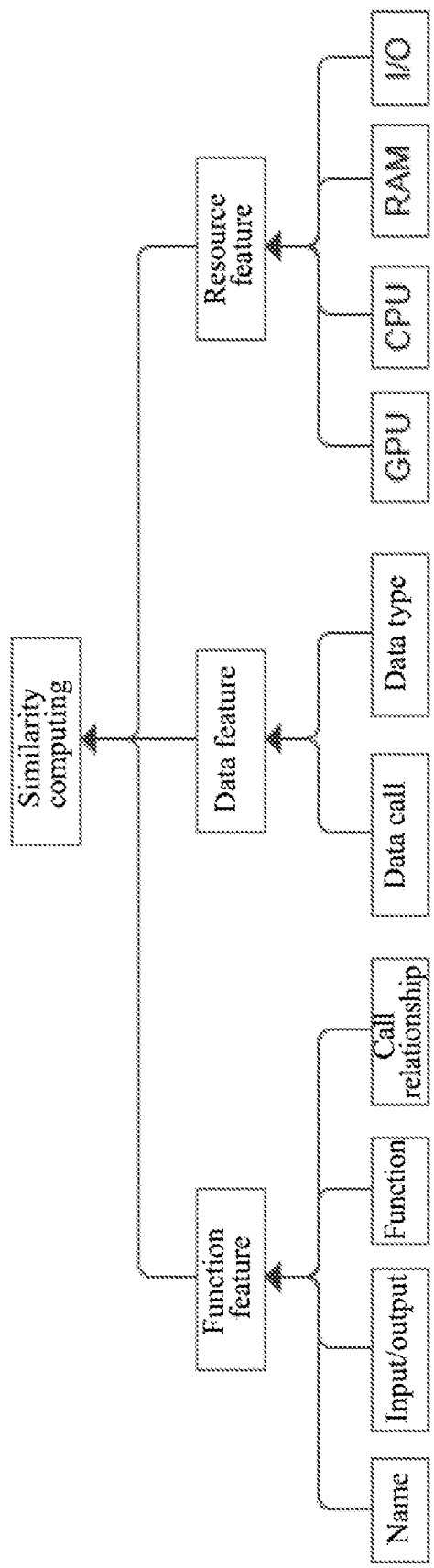
FIG. 7 is a schematic flow diagram of Example 7.

The collection types of functions, as shown in FIG. 7, may include the following types: name, input, output, function description, and calling relation of functions. In terms of data features, data calling relation and data type can be collected. In terms of resource features, information such as GPU, CPU, RAM, and I/O can be collected After grouping the function feature information average values of the functions, a program intelligent decomposition algorithm model was obtained based on the grouping result.

Example 8

An Example of the present disclosure also provides a computer readable storage medium on which a program is stored. In an embodiment, when executed by a processor, the program implements one of the job decomposition processing methods for distributed computing according to the above Examples.

The computer readable storage medium may be an internal storage unit, such as a hard disk or a memory, of any data processing capable device according to any of the preceding Examples. The computer readable storage medium may also be any device with data processing capabilities, such as a plug-in hard disk, a Smart Media Card (SMC), an SD card, a Flash Card, etc., provided on the device. Further, the computer readable storage medium may also include both an internal storage unit and an external storage device of any device having data processing capabilities. The computer readable storage medium is used to store the computer program and other programs and data required by any data processing capable device, and may also be used to temporarily store data that has been output or is to be output.

While the present disclosure has been particularly shown and described with reference to the accompanying drawings, it is to be understood that various modifications, equivalents, modifications, and the like can be made without departing from the spirit and scope of the application as defined by the appended claims.

What is claimed is:

1. A job decomposition processing method for distributed computing, comprising:
    analyzing a source program to be run by program static analysis to determine a function call graph contained in the source program being run, wherein the function call graph is configured to characterize a Call relationship between functions contained in the source program;
    determining function feature information in the functions contained in the source program according to the Call relationship between the functions, wherein the function feature information is configured to characterize function computing-related information when each of the functions is being run;
    decomposing the source program according to the function feature information, a function relationship and available resource information of a platform on which a source program is to be run, and determining a running relationship between the functions contained in the source program and an execution recommendation for each function on the platform when the source program is being run on the platform, wherein the running relationship comprises serial running and/or parallel running, and the execution recommendation is configured to indicate hardware resources on the platform to execute each function;
    inserting a modifier of codes based on a distributed computing framework in the source program according to the function Call relationship and the execution recommendation, so that the source program is capable of conducting distributed computing on the platform; and
    running the source program in which the modifier has been inserted on the platform according to the execution recommendation.

2. The job decomposition processing method for distributed computing according to claim 1, wherein said analyzing the source program to be run by program static analysis to determine the function call graph contained in the source program being run comprises:
    scanning codes of the source program without running the codes of the source program to determine the function call graph contained in the source program.

3. The job decomposition processing method for distributed computing according to claim 1, further comprises: saving the function call graph with an adjacency table, wherein the function call graph is a directed acyclic graph.

4. The job decomposition processing method for distributed computing according to claim 2, wherein said scanning the codes of the source program without running the codes of the source program to determine the function call graph contained in the source program comprises:
    performing code segmentation and collection on the source program: dividing the program into a plurality of packages, analyzing and managing dependencies within the packages, and creating a node Call relationship graph;
    extracting function information for each function in the source program: constructing different information extraction structures according to function declarations and calling mode to extract information about parameters and types of the parameters, respectively, to obtain an inter-function relationship table; and
    generating a function call graph based on the node Call relationship graph and the inter-function relationship table.

5. The job decomposition processing method for distributed computing according to claim 1, wherein said determining function feature information in the functions contained in the source program according to the Call relationship comprises: determining the function feature information in the functions contained in the source program by program dynamics analysis according to the Call relationship.

6. The job decomposition processing method for distributed computing according to claim 5, wherein said determining the function feature information in the functions contained in the source program by program dynamics analysis according to the Call relationship comprises:
    performing an instrumentation operation on each function in program before the source program is run; and
    entering instrumented recording functions when the source program is being run to record feature data during execution of each function, wherein the feature data comprises at least one of following function computing-related information: GPU, CPU, memory, I/O, run time.

7. The job decomposition processing method for distributed computing according to claim 1, wherein said determining function feature information in the functions contained in the source program according to the Call relationship comprises: determining the function feature information in the functions contained in the source program according to the Call relationship by a pre-trained program intelligent decomposition algorithm;
    wherein an input of the program intelligent decomposition algorithm is the Call relationship and an output is the function feature information in the functions contained in the source program.

8. The job decomposition processing method for distributed computing according to claim 7, wherein a training process of the program intelligent decomposition algorithm comprises:
    executing repeatedly for at least twice on a single resource for each of the functions in different programs in case of a consistent data amount, and obtaining a function feature information average value corresponding to each of the functions; and
    grouping function feature information average values of different functions, and obtaining a program intelligent decomposition algorithm model based on a grouping result by using machine learning and/or a knowledge graph model to train;
    wherein training data of the training process is a function feature table generated by an average value obtained by repeatedly executing functions on the single resource, and a training result is a program intelligent decomposition algorithm based on machine learning and knowledge graph model formed by grouping the function feature table.

9. The job decomposition processing method for distributed computing according to claim 8, wherein the program intelligent decomposition algorithm comprises at least one of:
    similarity metric modeling, regression similarity learning, classification similarity learning, and ranking similarity learning.

10. The job decomposition processing method for distributed computing according to claim 1, wherein the hardware resources of the platform comprise at least one of servers, virtual machines, gateways, and end computing devices, and wherein the execution recommendation is characterized by an execution recommendation table.

11. The job decomposition processing method for distributed computing according to claim 1, wherein the codes based on the distributed computing framework comprise one of: MapReduce, Ray, and Spark.

* * * * *